United States Patent [19]

Baavhammar

[11] Patent Number: 5,313,045
[45] Date of Patent: May 17, 1994

[54] METHOD AND APPARATUS FOR REDUCING ENERGY CONSUMPTION AND MINIMIZING MARTENSITE FORMATIONS WHEN JOINING A CONNECTING PIECE OF METAL WITH A METAL SURFACE BY PIN BRAZING

[75] Inventor: Torsten Baavhammar, Vellinge, Sweden

[73] Assignee: Safetrack Baavhammar AB, Arlov, Sweden

[21] Appl. No.: 748,210

[22] Filed: Aug. 22, 1991

[30] Foreign Application Priority Data

Nov. 22, 1990 [SE] Sweden .................. 9003708-6

[51] Int. Cl.⁵ .................................................. B23K 1/00
[52] U.S. Cl. .................................. 219/129; 219/85.22; 219/137 PS
[58] Field of Search .................. 219/98, 99, 137 PS, 219/85.19, 85.22, 129

[56] References Cited

U.S. PATENT DOCUMENTS

| 4,456,808 | 6/1984 | Wilkinson et al. ........ 219/98 |
| 4,503,310 | 3/1985 | van Loon ..................... 219/98 |
| 4,804,811 | 2/1989 | Raycher et al. ............ 219/98 |

FOREIGN PATENT DOCUMENTS 129849 3/1951 Sweden .
8404050-0 1/1984 Sweden .

*Primary Examiner*—Clifford C. Shaw
*Attorney, Agent, or Firm*—Jacobson, Price, Holman & Stern

[57] ABSTRACT

A method and apparatus for reducing energy consumption and minimizing martensite formations when joining a connecting piece of metal with a metal surface by pin brazing. The method comprises the steps of 1) measuring the exact amount of energy required to melt a particular brazing pin against a certain workpiece surface; 2) applying a welding current through the particular brazing pin and the certain workpiece surface to effect pin brazing; 3) calculating the amount of energy which has passed through the brazing pin during pin brazing by multiplying the square of the welding current times the duration of the welding current; 4) advancing the brazing pin automatically toward the workpiece surface during pin brazing so that the distance between the brazing pin and the workpiece remains constant while the welding current is being applied; 5) terminating the welding current when the calculation of the amount of energy which has passed through the particular brazing pin results in the exact amount of energy required to melt the particular pin; and 6) automatically interrupting the welding current if a predetermined period of time expires prior to termination of the welding current. An apparatus is provided for carrying out this method.

6 Claims, 4 Drawing Sheets

METHOD AND APPARATUS FOR REDUCING ENERGY CONSUMPTION AND MINIMIZING MARTENSITE FORMATIONS WHEN JOINING A CONNECTING PIECE OF METAL WITH A METAL SURFACE BY PIN BRAZING

BACKGROUND OF THE INVENTION

The present invention relates to a method and apparatus for saving energy when joining a connecting piece of metal with a metal surface by pin brazing, wherein heat is generated by an electronic welding arc and the required energy for the process is carefully supervised and controlled and wherein structural changes such as martensite formations, are minimized under the brazing site in, for example, a railway track or in pipe lines.

A conventional method for producing the above mentioned connections is described in Swedish patent 129 849 and 8404050-0.

One problem with using the conventional methods on railway tracks is that the strong heat released under the brazing site causes a proportionately strong martensite formation, which, in turn, can result in crack formations.

A further problem is the large energy consumption of the conventional methods, among other things, due to the use of brazing pins having a timed wire (or fuse wire). This wire, which is usually made of copper, regulates the duration of the welding process by melting after a certain period of time. This, in turn, causes the current supply to cease. Furthermore, the conventional equipment includes many contacts with large energy consumption. All these items result in fewer brazings for each current supply unit.

Another problem with the conventional methods involves the fact that at the beginning of the process, the brazing pin is raised up from the work-piece a distance of about 2 mm. This distance must be manually adjusted with precision and must be controlled visually, in an arrangement in a brazing gun, at every brazing occasion in order to avoid brazing failure and high martensite formations.

A still further problem with conventional pin brazing methods is that the current from the current sources normally used, is not constant. The current usually comes from a source consisting of batteries. The current used when brazing is not constant, and varies usually depending on the battery, cables, fuse wire, contact passages in the brazing gun as well as the length of the welding arc. These variables result in unsatisfactory brazing and large structural changes in the work material. Furthermore, the distance between the brazing pin of the brazing gun and the work piece increases as the brazing pin melts down, which, in turn, affects the current.

Another problem with conventional methods is that the work-piece can be insufficiently grounded thus resulting in a failed brazing and consumption of material.

SUMMARY OF THE INVENTION

The present invention relates to a method and apparatus wherein the above mentioned problems are avoided.

One object of the present invention is to minimize the martensite formation or structural changes under the brazing in the material. With the present method, a current intensity is used which is 30%–40% lower than that of the conventional methods mentioned above. This results in a smaller rise in the work piece's temperature and accordingly a reduction in martensite formation.

A further object of the invention is a strong reduction in energy consumption during the pin brazing process and a more regular and exact duration of the process. A larger number of brazings are thus obtained for each current supply unit.

Another object is to provide an automatic adjustment of the range of lift of the brazing gun at the beginning of the brazing process and to maintain this range of lift constant through the beginning of the brazing process and at different brazing occasions. In particular, this is provided by a mechanism which automatically keeps the pre-set range of lift constant on a scale.

A further object of the invention is to keep the welding arc length distance between the brazing pin in the brazing gun and the work piece, constant during the brazing process. It is also possible with the present invention to check the grounding by passing a low current through without starting the brazing process and damaging the brazing pin.

An advantage is also that the costs will be minimized for the brazing process since no brazing pin with a fuse wire will be required and since there will be fewer failed brazings. In particular, this will be obtained by measuring and regulating the current. During the pin brazing process the length of the welding arc tends to increase as the brazing pin melts down which, in turn, causes a reduction in the current. This, however, is avoided by continuously adjusting the length of the welding arc to a constant value throughout the whole pin brazing process.

The characteristics for the present invention will be described in the appended claims.

BRIEF DESCRIPTION OF THE DRAWINGS

The invention will now be described in detail with reference to the enclosed drawings, which show a preferred embodiment, in which figure 1 generally shows the duration of the brazing process with the current as a function of time.

DETAILED DESCRIPTION

Figure 1:
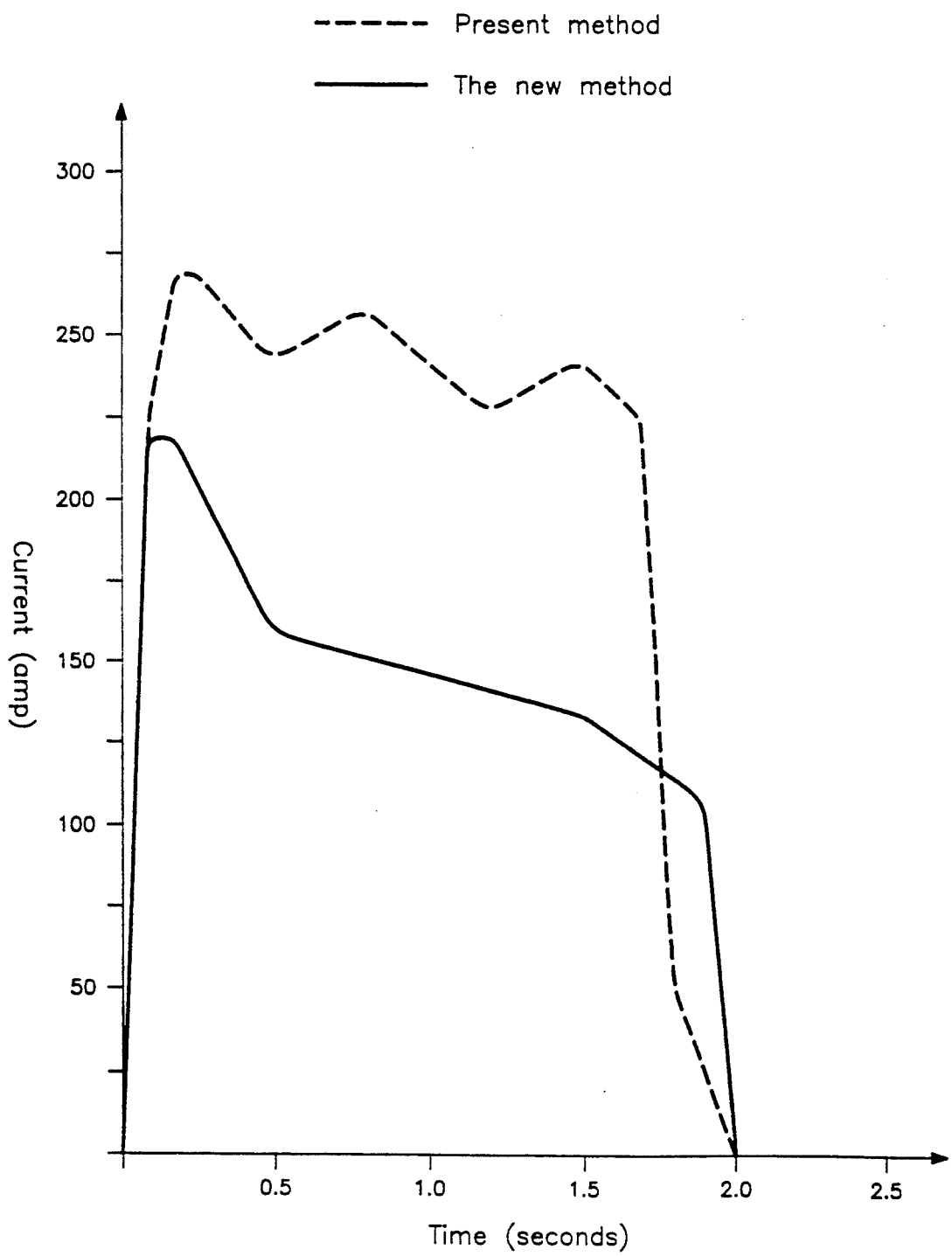

FIG. 1 is a diagram of the brazing process with the current as a function of time. Two curves are drawn. The first one shows the process using a conventional method. From this curve it is possible to see the irregular and uncontrolled process. This is partly due to the fact that the whole process is controlled by a timed wire designed to melt off.

The curve below shows the brazing process when performed according to the method of the present invention. Clearly, a more regular process is achieved, which is due to the fact that a preliminary amount of energy is furnished into the process and the process need not rely on the irregular characteristics of a timed wire melting off.

Figure 2:
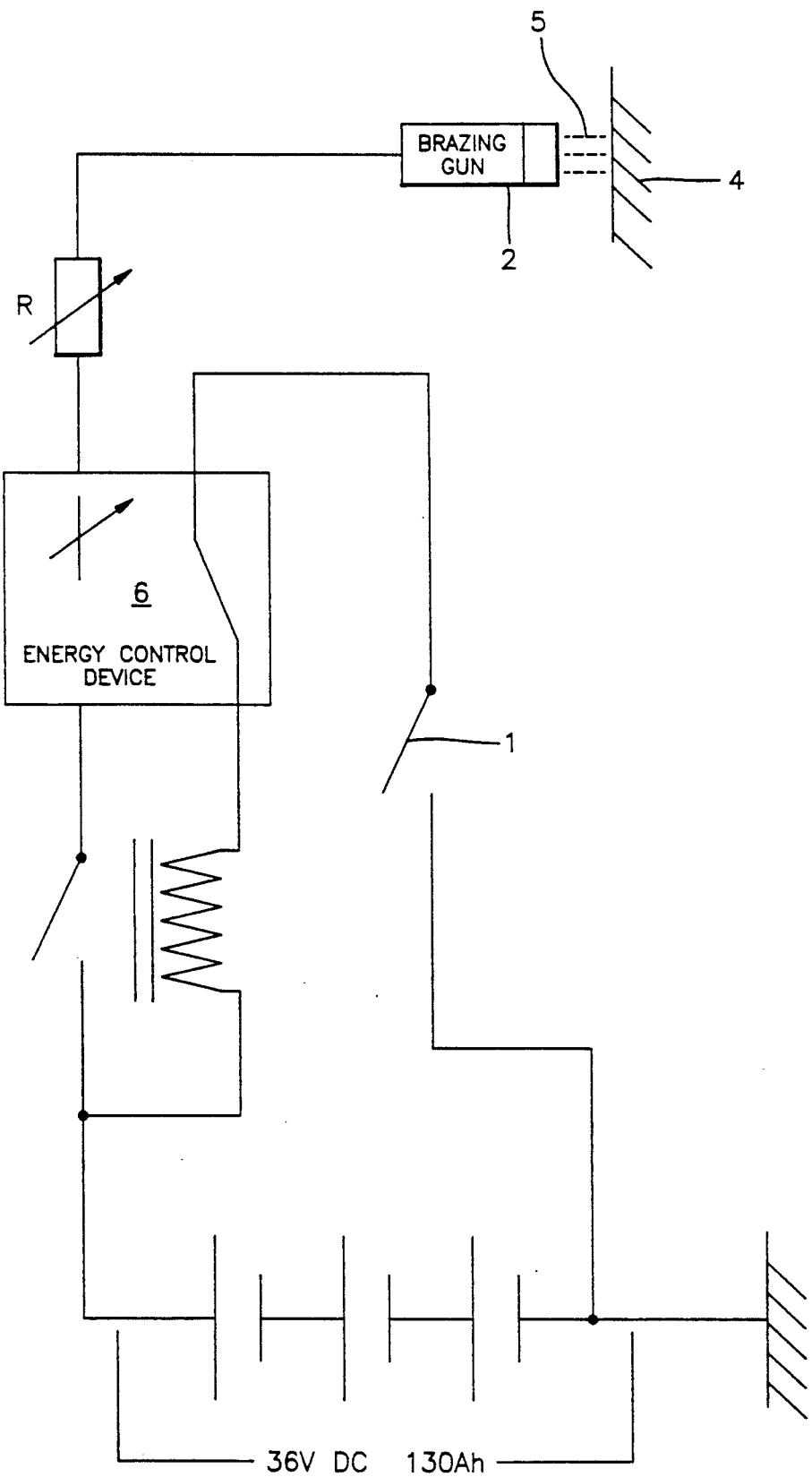
figure 2 is a schematic diagram illustrating the pin brazing of railbonds on steel.
Figure 3:
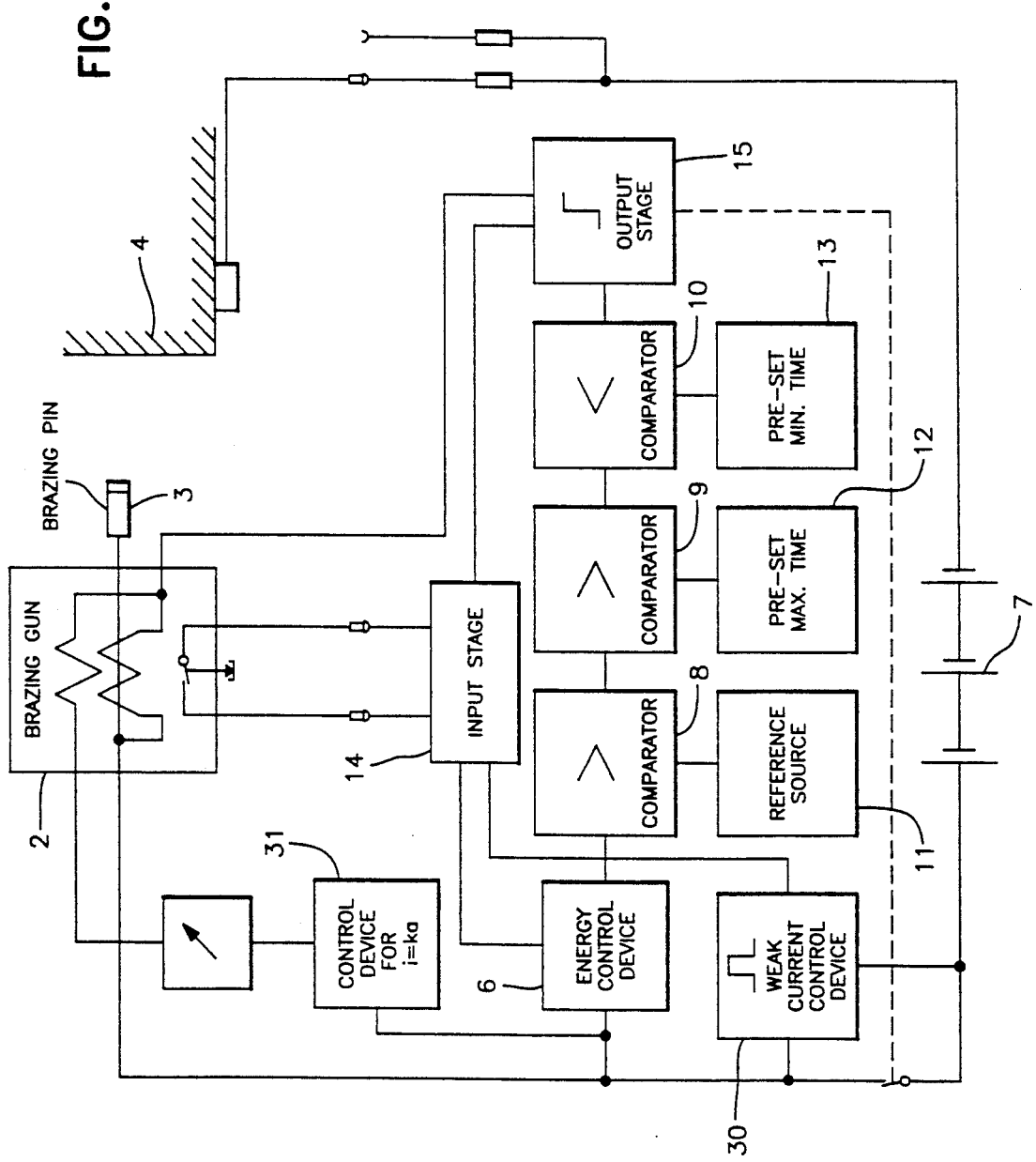
figure 3 shows a block diagram of the control system for pin brazing; and finally
Figure 4:
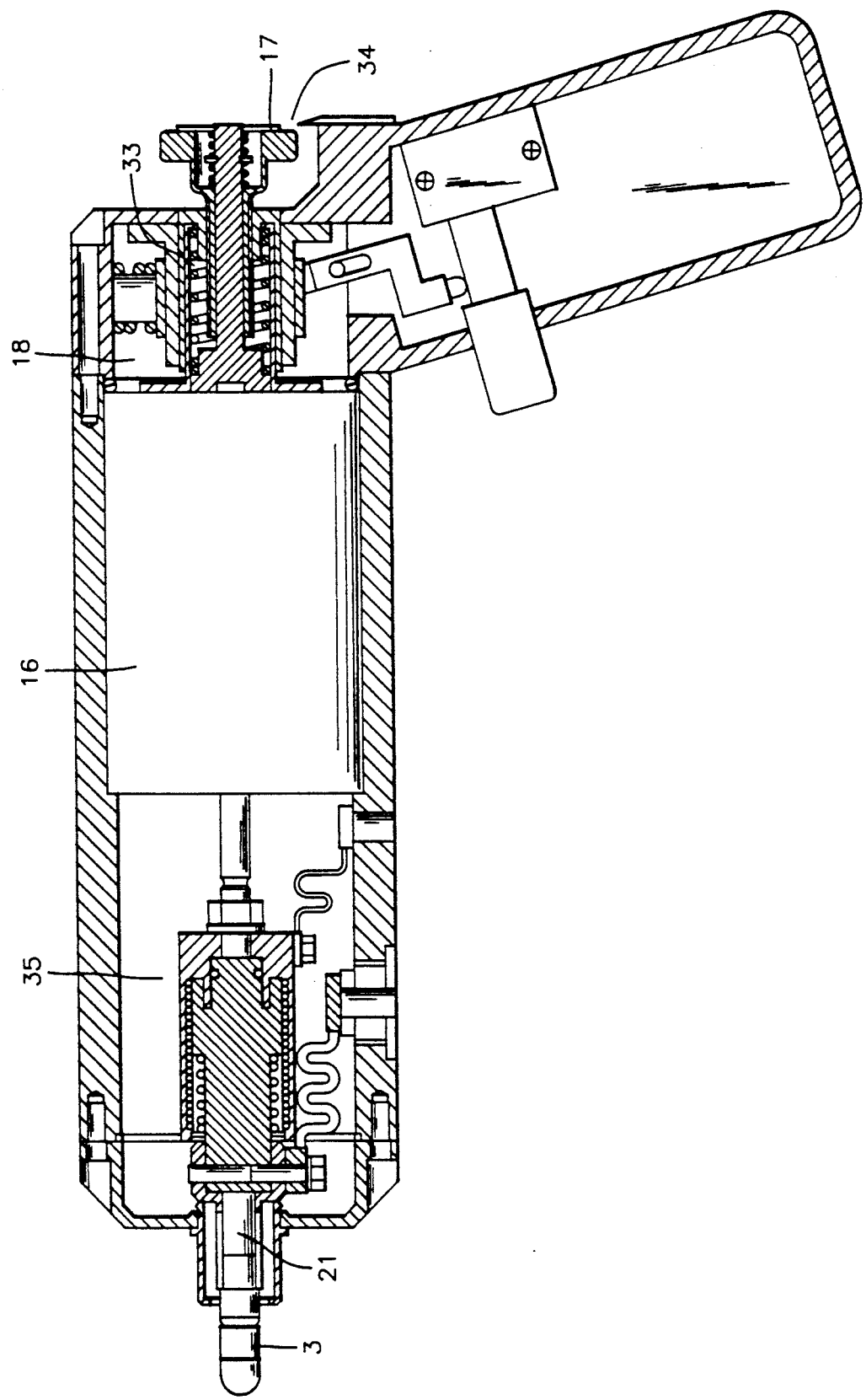
figure 4 shows a brazing gun in accordance with the present invention.

FIGS. 2–4 show a preferred embodiment of the present invention and schematically illustrate the method, wherein a brazing gun 2 is connected to a positive pole and the work piece, for instance a rail or a pipe is connected to the negative pole. The connecting piece, a cable lug, is placed against the brazing site. A brazing pin 3 which is pressed into the brazing gun, is then put into a hole in the cable lug and pressed against the track 4 with a certain force given by a mechanical spring 33 in the brazing gun 2. When the circuit is closed by a relay through a switch 1 in the brazing gun 2, a short circuit is created between the brazing pin 3 and the track. The brazing pin 3 constitutes the electrode in the process. At the same time an electromagnet 16 is activated which is dimensioned to overcome the force form the mechanical spring 33 and it lifts up the brazing pin 3 from the track to a pre-set position, for example 2 mm, whereas the welding arc 5 is formed between the brazing pin 3 and the work piece 4. The lead and the fluxing agent fixed o the brazing pin 3 then start melting down into the hole in the cable lug.

When the exact amount of energy needed to melt down all the lead on the brazing pin 3 has passed the energy control device 6, the energy control device 6 cuts out the outgoing energy. Simultaneously, the remaining part of the brazing pin 3 is pressed down into the molten material by a force adapted and adjustable by the mechanical spring 33. The energy control device 6 measures and calculates the energy based on the square of the current multiplied with the time according to the formula $E = I^2 \cdot t$. The result of this will be that an exact amount of energy will be supplied for melting down the lead. On the energy control device 6 there is also a manual control for adjusting the amount of energy, depending on the size of the brazing pin 3 and/or the amount of silver in the lead. The range of lift applied to the brazing pin 3 is adjusted with help from a scale 34 on the brazing gun 2. The distance from the brazing pin 3 to the work piece 4 fluctuates from one brazing occasion to another, and depends on the shape of the cable lugs. With the mechanism in the brazing gun, the pre-set of the range of lift applied to the brazing pin 3 is kept exactly the same during the different brazing occasions. The distance between the lead on the brazing pin 3 and the work piece 4 therefore remains constant during the brazing process. In particular, this is provided by automatically moving the brazing pin 3 forward as the lead melts down.

FIG. 3 shows a circuit diagram for the steering control system wherein the energy control device 6 divides up the different units and is connected together with a brazing gun 2 and a current source 7. The brazing gun 2 is shown with a melting lead on the brazing pin 3. When the circuit breaker 1 on the brazing gun 2 is closed, a short circuit condition occurs. From a current source 7, current is fed into the energy control device 6 and there, $I^2 \cdot t$ is measured and via the comparators 8, 9 and 10, the energy is compared against a reference source 11, a pre-set maximum time 12 and a pre-set minimum time 13. Through the input stage 14 the brazing process is started. The current loop to the brazing gun 2 is closed through the output stage 15. The reference source 11 is manually pre-set on a value. This value is adjusted to the size of the brazing pin 3 and the proportion of silver in the lead. The current is cut off through the output stage 15 when the reference value 11 is achieved and the minimum time 13 elapses or when the maximum time 12 is exceeded.

Before the start of the brazing process, it is possible to determine whether the work piece 4 is properly grounded. This is done by letting a weak current pass through a control device 30 so that a measurement is performed prior to starting the brazing process. In order to keep the distance, i.e. the length of the welding arc between the brazing pin 3 and the work piece 4 constant during the brazing process, a control device 31 controls the process according to the formula $i = k/a$ where i is the current and k is an empirically determined constant and a is the welding arc length (the distance between the brazing pin 3 and the work piece 4). As the lead burns off the welding arc length tends to increase, however, by a regulation of the current i, the distance remains constant during the whole brazing process.

FIG. 4 shows the brazing gun 2, wherein a brazing pin carrier 21 is connected with an electromagnet 16 which raises the brazing pin 3 from the work piece 4 at the beginning of the brazing process. The range of lift is manually adjusted via an adjustment device 17. A control mechanism 18 controls and keeps the pre-set range of lift precise during each brazing occasion. The distance between the brazing pin 3 and the work piece 4 is kept constant all the time during the burn-off of the lead.

The principle of the invention is that it is possible via the energy control device 6 to measure the exact amount of energy $I^2 \cdot t$ which is required to melt down the lead and to interrupt the process when the required amount of energy has been supplied. Furthermore, if the brazing has not been executed within a certain time, the process is automatically interrupted by a drop in the energy control device 6.

By providing the foregoing arrangement, the brazing site can never be supplied with too much energy during the brazing process and the distance between the brazing pin 3 and the work piece 4 remains constant during the process.

The invention should not be considered as restricted to the embodiments described above and illustrated in the drawings, since it permits being modified within the spirit and scope of the appended claims.

I claim:

1. A method for reducing energy consumption and minimizing martensite formations when joining a connecting piece of metal with a metal surface by pin brazing, comprising the steps of:

measuring the exact amount of energy required to melt a particular brazing pin against a certain workpiece surface;

applying a welding current through the particular brazing pin and the certain workpiece surface to effect pin brazing;

calculating the amount of energy which has passed through said particular brazing pin during pin brazing by multiplying the square of the welding current times the duration of said welding current;

advancing the brazing pin automatically toward the workpiece surface during pin brazing so that the distance between the brazing pin and the workpiece remains constant while the welding current is being applied;

terminating said welding current when said step of calculating the amount of energy which has passed through the particular brazing pin results in said exact amount of energy required to melt the particular pin; and automatically interrupting said welding current if a predetermined period of time expires prior to said step of terminating.

2. The method of claim 1, wherein said step of advancing includes the steps of:

initially pressing the brazing pin against the workpiece surface; and subsequently lifting the brazing pin automatically to a pre-set distance from said workpiece surface, at the instant that said welding current is applied.

3. The method of claim 1, and further comprising the step of applying a weak current through a control device, the workpiece surface and the brazing pin, prior to said step of applying a welding current, in order to determine whether the workpiece surface is properly grounded.

4. An apparatus for reducing energy consumption and minimizing martensite formations when joining a connecting piece of metal with a metal surface using a pin brazing gun; said apparatus comprising:

an electrical current source connected to said pin brazing gun;

an energy control device connected to said electrical current source, for calculating the amount of electrical energy applied by the pin brazing gun during a pin brazing process, by multiplying the square of an applied welding current ties the duration of said applied welding current;

means for storing a value corresponding to the amount of energy required to melt a particular brazing pin against a certain workpiece surface;

means connected to said energy control device and also connected to said means for storing a value, for comparing said value to the amount of electrical energy calculated by the energy control device;

output stage means connected to said means for comparing said value and also connected to said brazing gun, for terminating said applied welding current when said value is determined to equal the amount of electrical energy calculated by the energy control device;

means for automatically interrupting said applied welding current if said output stage fails to terminate said welding current within a predetermined period of time;

means for advancing said brazing pin in said brazing gun so that the distance between the brazing pin and the workpiece surface remains constant while said welding current is being applied.

5. The apparatus of claim 4, and further comprising:

means for automatically lifting the brazing pin to a preset distance from said workpiece surface, at the instant that said welding current is applied; and means for setting said pre-set distance.

6. The apparatus of claim 4, and further comprising a weak current control device for applying a weak current through the workpiece surface and the brazing pin, prior to applying said welding current, in order to determine whether the workpiece surface is properly grounded.

* * * * *